Sept. 6, 1927.  1,641,187
L. W. MELCHER
TRANSMISSION GEARING
Original Filed March 5, 1923    2 Sheets-Sheet 1
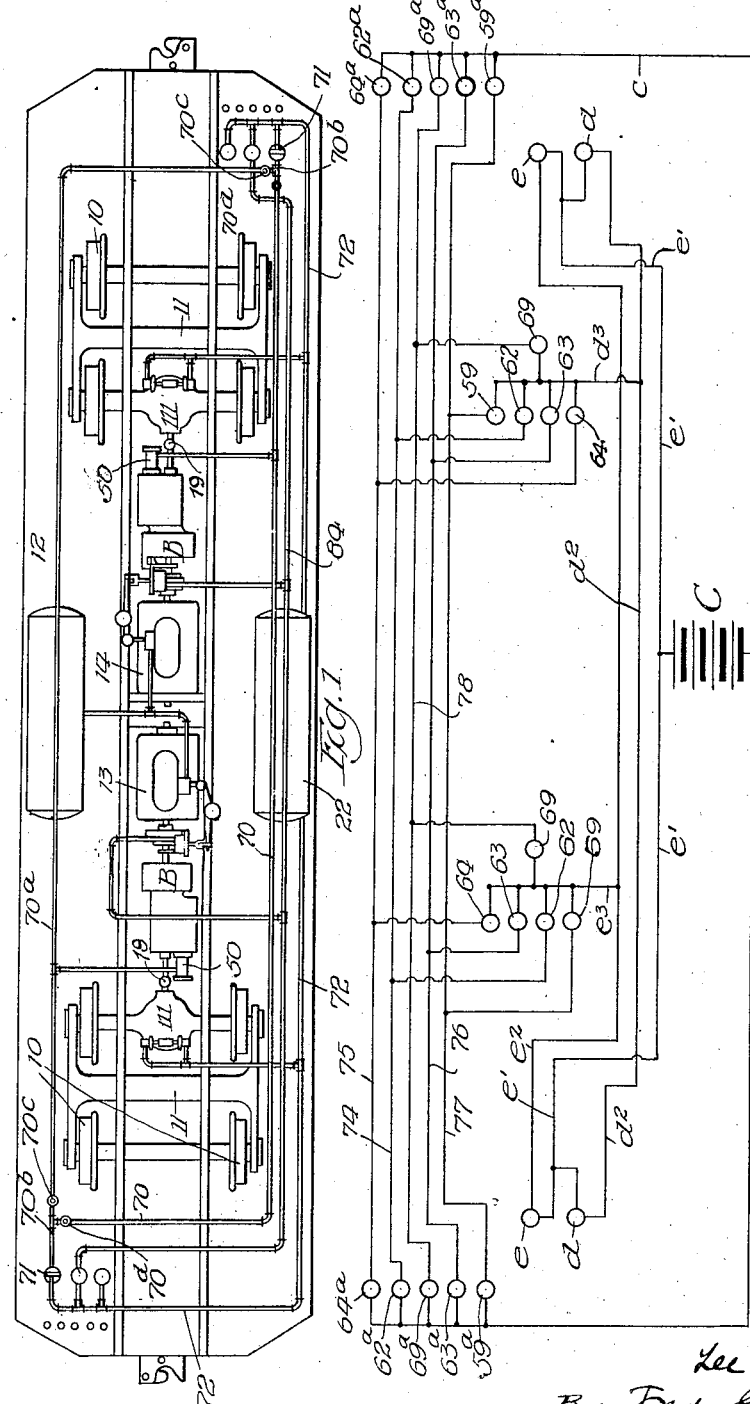

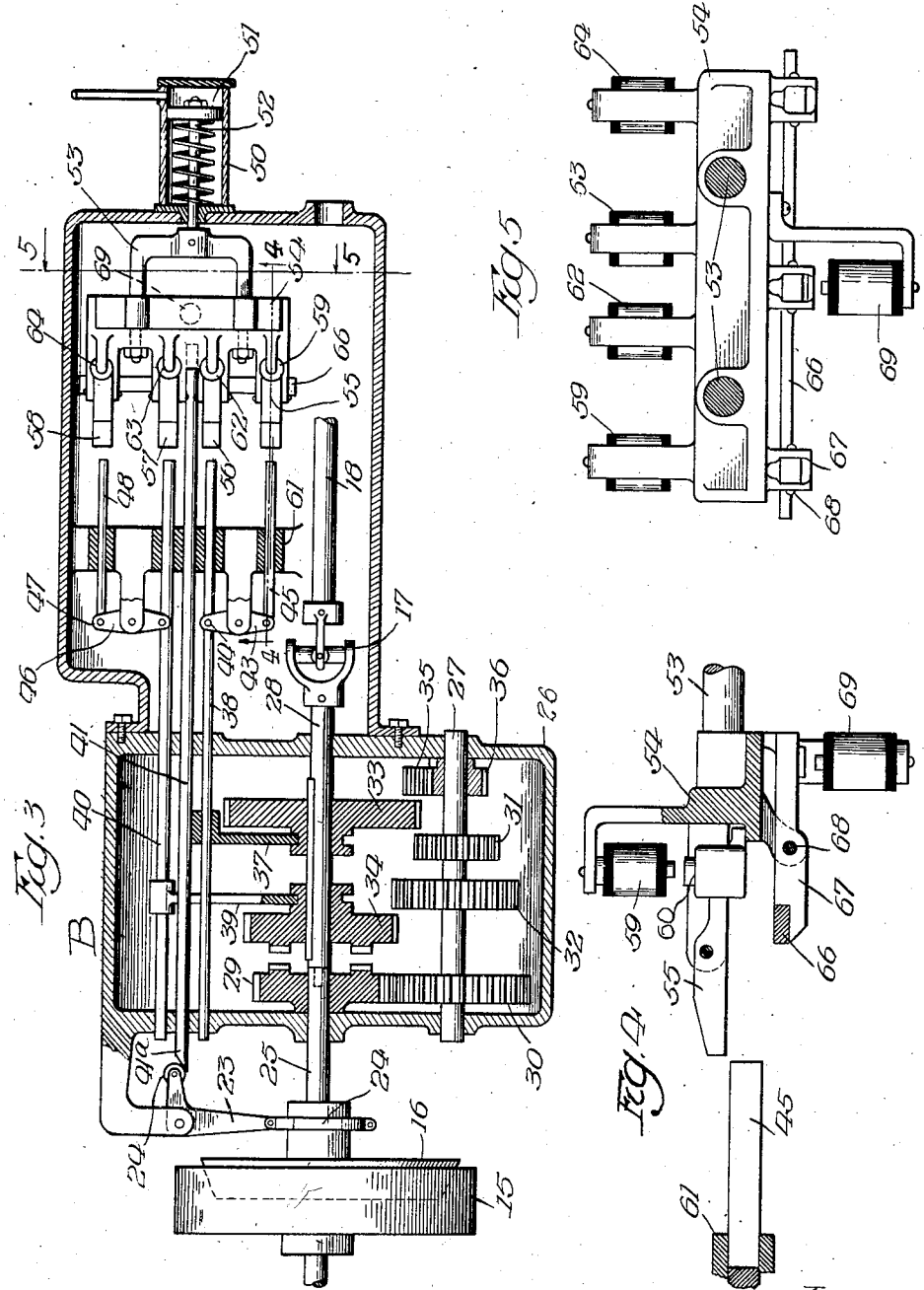

Patented Sept. 6, 1927.

1,641,187

UNITED STATES PATENT OFFICE.

LEE W. MELCHER, OF WEST DEPERE, WISCONSIN.

TRANSMISSION GEARING.

Original application filed March 5, 1923, Serial No. 622,751. Divided and this application filed November 12, 1924. Serial No. 749,385.

The invention relates to mechanism for controlling the operation and shifting of power transmission gearing, and more particularly to such gearing as is used with cars or trucks propelled by internal combustion motors.

This application is a division of the application filed by me March 5, 1923, Serial No. 622,751.

The object of the invention is to provide new and improved gear operating or shifting mechanism in which fluid under pressure is used as a motive agent for shifting the gears, and electrically controlled devices are used to control the operation of the gear-shifting elements.

Other objects of the invention will appear from the detailed description.

The invention consists in the several novel features hereinafter set forth and more particularly defined by the claims at the conclusion hereof.

In the drawings: Fig. 1 is a diagrammatic plan view of a railway car provided with the invention. Fig. 2 is a diagram of the electric circuits for the gear operating and shifting mechanism. Fig. 3 is a sectional view of the variable speed and reversible transmission gearing between one of the motors and one of the axles and the air pressure mechanism for shifting the gearing under electro-magnetic control. Fig. 4 is an enlarged section taken on line 4—4 of Fig. 3. Fig. 5 is an enlarged section taken on line 5—5 of Fig. 3.

The invention is exemplified in connection with a railway car comprising wheels 10 adapted to run on tracks, trucks 11 and a body 12, which may be of any suitable construction, as well understood in the art. The power plant for propelling the car comprises a pair of independent internal combustion motors 13 and 14, each of which is of the multi-cylinder type, and is suitably mounted under the body of the car. Each motor is connected to drive one pair of wheels 10 through a clutch comprising a drive-member 15 connected to the motor and a driven member 16 connected by a shaft 25 to drive variable speed and reversible transmission gearing B, which is connected to drive a universal joint 17, which drives a universal shaft 18 to drive a second universal joint 19, which is connected to drive reversible gearing of suitable construction in a gear-case 111 around a traction-wheel axle.

The present invention contemplates the use of compressed air for effecting the movement of the gear-shifting parts, and for this purpose, a reservoir 22 is provided, which is connected to receive air from a compressor (not shown) operated by one or more of the motors, so that there will be maintained therein a substantially uniform pressure of air.

The driven clutch-member 16 is operable into and out of driving relation with member 15 by a bell-crank lever 23 which is pivoted so it will shift a collar 24 in a groove in the hub of driven member 16. The driven member of the clutch is slidable on and adapted to drive shaft 25. The transmission-gearing comprises a case 26 containing a countershaft 27. The shaft 18 which is driven by the universal joint 17 is also extended into the case and is coaxial with shaft 25. A gear 29 fixed on the inner end of shaft 25 meshes constantly with a gear 30 which is fixed on and drives the countershaft 27. A low-speed pinion 31 and an intermediate or second speed pinion 32 are fixed to countershaft 27. A gear 33, slidably mounted on shaft 28, is adapted to be shifted into engagement with pinion 31 to drive shaft 28 at low speed in forward direction. A gear 34, which is slidably mounted on and adapted to drive shaft 28, is shiftable into engagement with gear 32 to drive the car at intermediate speed and also into direct driving connection with the gear 29 to propel the car at high speed. Gear 33 is also adapted to be shifted into engagement with a reverse pinion 35 which is driven by a pinion 36 on the countershaft 24. Gear 33 is shiftable by a fork 37 which is fixed to a bar 38 which is slidably mounted in the gear-case 26. Gear 34 is shiftable by a fork 39 which is fixed to a bar 40 which is slidable longitudinally in the gear-case 26. A rod 41, which is also slidable through the gear-case, is provided with an inclined end 41ª to engage a roller 42 on one arm of the bell-crank lever 23 to disengage clutch-member 16 from member 15. Normally, gears 33, 34 are in neutral position. By shifting gear 33 in one direction, it will mesh with the low speed pinion 31 and by shift in the opposite direction, it will mesh with the reverse pinion 35. By shifting gear 34 in one direction, it will mesh with intermediate speed pinion 32 and, by shift in the opposite direction, it will be drivably connected to the gear 29 on shaft 25. Bars 38 and 40 are shifted in one direction by dogs acting directly on their ends respectively. To shift bar 38 in the opposite direction, a centrally fulcrumed lever 43 is pivoted at one of its ends to said bar at 44 and has its other end pivoted to a slidable bar 45 which moves reversely to bar 38, through said lever. A similar centrally pivoted lever 46 has one of its ends pivoted to bar 40 and its other end pivoted, as at 47, to a slidable bar 48.

The new and improved mechanism for operating each set of these gear-shift bars 45, 38, 40, 48 comprises a cylinder 50, a piston 51 slidable therein, a piston rod 52 fixed to the piston and extending to the outside of the cylinder, a yoke 53 fixed to said rod, a cross-head 54 fixed to said yoke and a series of four dogs 55, 56, 57 and 58, each pivoted to the cross-head and extended to engage the end of one of the gear-shift rods. These dogs are pivoted so they may be selectively shifted into position to operate one of the rods by electro-magnets 59, 62, 63 and 64 respectively. These electro-magnets are mounted on cross-head 54. Each dog is normally positioned to clear its associated gear-shift rod and carries an armature 60 which is adapted to be attracted by the core of a magnet when its helix is energized, to lift the tail of the dog and cause its front end to be lowered into position to engage one of the gear-shift rods when the yoke 53 and head 54 are operated by the admission of air under pressure to the cylinder 50. A bearing 61 is provided for each of the gear-shift rods. Magnets 59, 62, 63 and 64 are separately controlled so that the operator can selectively cause them to be energized according to the gear-change desired.

A cross-bar 66, rigid with and fixed to arms 67, is pivotally connected at 68 to the cross-head 54. This cross-bar 66 is adapted to be shifted by a magnet 69 into position to engage all of the gear-shift bars to reset them in their normal or neutral position when the cross-head is operated for this purpose. Normally, bar 66 is positioned to pass under the gear-shift bars but when magnet 69 is energized, it will be raised to engage the rear ends of such of the gear-shift bars which have been shifted toward the cross-head and when the piston 51 and the cross-head 54 are operated, such bars will be shifted to their normal position, causing the other bars to be reversely shifted to their normal positions through levers 43, 46. Bar 41 is rigidly secured to reciprocate with cross-head 54 and consequently, during the initial outward shift of the cross-head, the inclined end 41ª of said bar will lift roller 42 and disconnect the clutch 15, 16. After its initial movement, bar 41 will pass under roller 42 and cause the clutch to remain inoperative until the selected gear-shift rod has been set and the cross-rod is retracted. At the end of the retractile stroke, lever 23 will be released to permit the clutch to become operative.

When more than one engine is used cylinders 50 are respectively connected to pipes 70, 70ª (Fig. 1). A pipe 72 delivers air under pressure from reservoir 22 to the casings of three-way valves 71, one of which is located at each control station, there being one of said stations at either end of the car. The plug of each three-way valve 71 is adapted to deliver air under pressure from pipe 72 to a pipe 70ᵇ. Each pipe 70ᵇ is connected to both pipes 70, 70ª to deliver air into cylinders 50 to operate the gear-shift mechanisms. Each valve 71 is also adapted in one of its positions to cut off the supply of air from pipe 72 and open pipe 70 to atmosphere to exhaust the air from cylinder 50. At each end, pipes 70, 70ª are provided with valves 70ᶜ 70ᵈ, so that any of the cylinders 50 may be cut off from pipes 70ᵇ, at either control station. This construction makes it possible, by the manipulation of valves 70ᶜ, to render either of the cylinders inoperative from either control station, when either motor is idle. Normally, the valve 71 at the idle station is kept closed.

The helix of magnet 62, which controls the dog for the low speed gear-shift, is electrically connected to a conductor 74 which is connected to a switch 62ª at each control station. Magnet 64, for controlling the dog for the intermediate gear-shift, is connected to a conductor 75 which is connected to a switch 64ª at each control station. Magnet 63, which controls the dog for the high speed gear-shift, is connected to a conductor 76 which is connected to a switch 63ª at each control station. Magnet 59 for controlling the dog for the reverse gear-shaft, is connected to a conductor 77 which is connected to a switch 59ª at each control station. Magnet 69, for restoring the gear-shift mechanism into neutral or normal position, is connected to a conductor 78 which is connected to a switch 69ª at each control station. The electro-magnets 59, 62, 63, 64 for each transmission gearing are connected to the switches at the control stations, so that all of the corresponding magnets may be controlled from the switches at either station. Connections are provided to render the electro-magnets for either of the transmission gearings operative and inoperative from either of the control stations and, for this purpose, two switches d and e are provided at each control station. The battery C is connected to each of the switches e by a conductor $e'$. A conductor $d^2$, extending between switches $d$, is connected by a conductor $d^3$ to all of the magnets of one transmission gearing and a conductor $e^2$ between switches $e$ is connected by a conductor $e^3$ to all of the magnets for the other transmission gearing. The other side of the battery C is connected by a conductor $c$ to all of the switches $59^a$, $62^a$, $63^a$, $64^a$, and $69^a$ at both control stations.

The operation of the controlling mechanism for the variable speed gearing when the two motors are used will be as follows: Assuming the motors to be in operation and the gearings in their neutral positions, the operator will close the switch $62^a$ at whichever control station is in use, thus causing the following circuits to be established; battery C, conductor $e'$, switches $d$ and $e$ at the control station in use, conductors $e^2$ and $d^2$, conductors $e^3$, $d^3$, magnet 62, conductor 74, switch $62^a$ at the control station and conductors $c$. This will cause magnets 62 to become energized so they will shift dogs 56 to render them operative to shift rods 38. Next, the operator will manipulate the three-way valve 71 at the control station in use to deliver air under pressure from pipe 72 to pipes $70^b$ and pipes 70, $70^a$ into both of the cylinders 50. This will operate the pistons 51 to shift the cross-heads 54 outwardly and during their initial shift, rods 41 will disconnect clutches 15, 16 and thereafter dogs 56 will shift rods 38 to bring the gears 33 into position to be driven by pinions 31, so that shafts 28 will be driven at low speed. After the pistons 51 have been operated outwardly, the operator will manipulate valve 71 to exhaust air from cylinders 50 and, thereupon, the clutch rod 41 will be withdrawn to automatically permit the clutch to become operative. By similar cycles of operations, the operator can control the dogs 58, 57 and 55 through switches $64^a$, $63^a$ and $59^a$ respectively. Whenever the operator desires to set the transmissions in neutral positions, he will operate a switch $69^a$ which will close a circuit to magnet 69 to operate cross-bar 66 into the plane of the gear-shift rods and then manipulate a valve 71 to cause the cross-head 54 to operate said cross-bar and restore all of the gear-shift rods which are out of their normal positions to their neutral positions.

When one of the motors is idle, it is desirable that the gear-shifting mechanism should be rendered inoperative and this can be done by opening either of the switches $e$, $d$, at either of the control stations. When either of said switches is open, the circuits for the operation of the set of magnets to which it is connected will be cut out of the circuits controlled by the switches $64^a$, $62^a$, $69^a$, $63^a$ and $59^a$. By closing valve $70^c$, $70^d$, either of the cylinders 50 may be inoperative responsively to the valves 71 so that the cross-head for the corresponding transmission will be rendered inoperative.

It will be understood that although the gear-controlling mechanism is described in use with a car having two motors and two transmissions, that it may be used with a single transmission which is used for any purpose.

The invention exemplifies controlling means for variable speed transmission gearings in which compressed air or a fluid under pressure is used as the motive agent for effecting the gear-shifting and electro-magnets under selective control of the operator are used to control the operation of the gear-shifting elements. It also exemplifies mechanism for this purpose which readily adapts itself to the synchronous operation of a plurality of transmission gearings either from one or more controlling stations, as well as their individual operations when a motor is idle.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In mechanism of the character described, the combination of a drive shaft, a shaft to be driven, variable speed transmission gearing and a clutch between said shafts, and means for controlling said gearing comprising a slidably mounted carrier, gear-shifting elements mounted on the carrier, means for shifting the gearing, means for selectively controlling said elements to render them operative during the shift of the carrier, and clutch-shifting means connected to be operated by the carrier.

2. In mechanism of the character described, the combination of a drive shaft, a shaft to be driven, variable speed transmission gearing between said shafts, and controlling mechanism for said gearing comprising push bars connected at one end thereof to shift the gears, said bars having abutment portions at the other end thereof, a carrier mounted to slide toward and away from said abutment portions, members movably mounted on the carrier, said members being held normally in a position to overlap the abutment portions when the carrier is shifted toward said bars, means for selectively moving the members into a position to abut against said portions during shift of the carrier toward the bars, and means for shifting the carrier.

3. In a mechanism of the character described, the combination of a drive shaft, a shaft to be driven, variable speed transmission gearing between said shafts, and controlling mechanism for said gearing comprising push bars connected at one end thereof to shift the gears, said bars having abutment portions at the other end thereof, a carrier mounted to slide toward and away from said abutment portions, members movably mounted on the carrier, said members being held normally in a position to overlap the abutment portions when the carrier is shifted towards said bars, electromagnets mounted on the carrier for selectively moving the members into a position to abut against said portions during shift of the carrier toward the bars, and means for shifting the carrier.

4. In mechanism of the character described, the combination of a drive shaft, a shaft to be driven, variable speed transmission gearing, and a clutch between said shafts, controlling mechanism for said gearing comprising push bars connected at one end thereof to shift the gears, said bars having abutment portions at the other end thereof, a carrier mounted to slide toward and away from said abutment portions, members movably mounted on the carrier, said members being held normally in a position to overlap the abutment portions when the carrier is shifted toward said bars, means for selectively moving the members into a position to abut against said portions during shift of the carrier toward the bars, and means for shifting the carrier, and a clutch operating bar connected to the carrier and operable during shift of the carrier toward the bars.

5. In mechanism of the character described, the combination of a drive shaft, a shaft to be driven, variable speed transmission gearing between said shafts, and controlling mechanism for said gearing comprising push bars connected at one end thereof to shift the gears, said bars having abutment portions at the other end thereof, a carrier mounted to slide toward and away from said abutment portions, members movably mounted on the carrier, said members being held normally in a free position with respect to the bars, means carried by the carrier for selectively moving the members into a position to abut against the said abutment portions during shift of the carrier toward the bars, and means for shifting the carrier.

6. In mechanism of the character described, the combination of a drive shaft, a shaft to be driven, variable speed transmission gearing between said shafts, and controlling mechanism for said gearing comprising push bars connected at one end thereof to shift the gears, said bars having abutment portions at the other end thereof, a carrier mounted to slide toward and away from said abutment portions, members pivotally mounted on the carrier, said members being held normally in a free position with respect to the bars, means for swinging the members into a position to abut against the said abutment portions during shift of the carrier toward the bars, and means for shifting the carrier.

7. In mechanism of the character described, the combination of a drive shaft, a shaft to be driven, variable speed transmission gearing between said shafts, and controlling mechanism for said gearing comprising a pair of push bars, a centrally pivoted lever connected said bars at one end thereof, one of said bars being connected at said one end to shift one of the gears in opposite directions by relative shift of the bars, said bars having abutment portions at the other end thereof, a carrier mounted to slide toward and away from the abutment portions, members movably mounted on the carrier, means for selectively moving the members into a position to abut against said portions during shift of the carrier toward the bars, a cross bar movably mounted on the carrier, means for moving the cross bar into a position to abut against the abutment portions during shift of the carrier toward the bars to shift the latter into a neutral or inoperative position, and means for shifting the carrier.

8. In mechanism of the character described, the combination of a drive shaft, a shaft to be driven, variable speed transmission gearing between said shafts, and controlling mechanism for said gearing comprising a pair of push bars, a centrally pivoted lever connected to said bars at one end thereof, one of said bars being connected at said one end to shift one of the gears in opposite directions by relative shift of the bars, said bars having abutment portions at the other end thereof, a carrier mounted to slide toward and away from the abutment portions, members movably mounted on the carrier, means for selectively moving the members into a position to abut against said portions during shift of the carrier toward the bars, a cross bar movably mounted on the carrier, electromagnets for moving the cross bar into a position to abut againt the abutment portions during shift of the carrier toward the bars to shift the latter into a neutral or inoperative position, and means for shifting the carrier.

9. In mechanism of the character described, the combination of a drive shaft, a shaft to be driven, variable speed transmission gearing between said shafts, and controlling mechanism for said gearing comprising a pair of push bars, a centrally pivoted lever connected to said bars at one end thereof, one of said bars being connected at said one end to shift one of the gears in opposite directions by relative shift of the bars, said bars having abutment portions at the other end thereof, a carrier mounted to slide toward and away from the abutment portions, members movably mounted on the carrier, means for selectively moving the members into a position to abut against said portions during shift of the carrier toward the bars, a cross bar pivotally mounted on the carrier, means for swinging the cross bar into a position to abut against the abutment portions during shift of the carrier toward the bars to shift the latter into a neutral or inoperative position, and means for shifting the carrier.

Signed at Green Bay, Wisconsin, this first day of November, 1924.

LEE W. MELCHER.